US009586550B2

(12) United States Patent
Kuehne et al.

(10) Patent No.: US 9,586,550 B2
(45) Date of Patent: Mar. 7, 2017

(54) METHOD AND SYSTEM FOR OPERATING A MOTOR VEHICLE

(71) Applicant: AUDI AG, Ingolstadt (DE)

(72) Inventors: Marcus Kuehne, Beilngries (DE); Ulrich Mueller, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/105,896

(22) PCT Filed: Dec. 16, 2014

(86) PCT No.: PCT/EP2014/003381
§ 371 (c)(1),
(2) Date: Jun. 17, 2016

(87) PCT Pub. No.: WO2015/090570
PCT Pub. Date: Jun. 25, 2015

(65) Prior Publication Data
US 2016/0347271 A1   Dec. 1, 2016

(30) Foreign Application Priority Data

Dec. 20, 2013 (DE) .................. 10 2013 021 812

(51) Int. Cl.
*B60R 21/015*   (2006.01)
*B60R 16/037*   (2006.01)
(Continued)

(52) U.S. Cl.
CPC ... *B60R 21/01552* (2014.10); *B60H 1/00742* (2013.01); *B60H 1/00885* (2013.01);
(Continued)

(58) Field of Classification Search
CPC combination set(s) only.
See application file for complete search history.

(56) References Cited

U.S. PATENT DOCUMENTS 5,927,752 A   7/1999 Brandin
6,450,530 B1   9/2002 Frasher et al.
(Continued)

FOREIGN PATENT DOCUMENTS

DE   103 21 506 A1   12/2003
DE   102 57 963 A1   7/2004
(Continued)

OTHER PUBLICATIONS

WIPO English translation of International Preliminary Examination Report on Patentability for PCT/EP2014/003381 mailed Apr. 12, 2016.
(Continued)

*Primary Examiner* — Thomas G Black
*Assistant Examiner* — Ana Thomas
(74) *Attorney, Agent, or Firm* — Staas & Halsey LLP

(57) ABSTRACT

A spatial position of at least one first body part, arranged within a sensing range of a sensing device of the motor vehicle, of a vehicle occupant is sensed with respect to the motor vehicle by the sensing device. An anthropometric data model is provided with data including the dimensions of predetermined body parts of a person and the positioning of the body parts with respect to one another. As a result, a spatial position of at least one second body part of the same vehicle occupant which is arranged outside the sensing range of the sensing device can be determined, taking into consideration the sensed spatial position of the first body part and the anthropometric data model. At least one functional unit of the motor vehicle is actuated taking into consideration the sensed spatial position of the second body part.

8 Claims, 1 Drawing Sheet

(51) Int. Cl.
   *B60N 2/48*    (2006.01)
   *B60N 2/02*    (2006.01)
   *B60H 1/00*    (2006.01)
   B60W 50/00    (2006.01)
   B60R 21/01    (2006.01)

(52) U.S. Cl.
   CPC .............. *B60N 2/0244* (2013.01); *B60N 2/48* (2013.01); *B60N 2/4805* (2013.01); *B60R 16/037* (2013.01); B60N 2002/0268 (2013.01); B60R 2021/01211 (2013.01); B60R 2021/01265 (2013.01); B60W 2050/0029 (2013.01)

(56) References Cited

U.S. PATENT DOCUMENTS

| | | | |
|---|---|---|---|
| 6,614,344 B1* | 9/2003 | Frasher | B60N 2/0252 340/425.5 |
| 9,511,683 B2* | 12/2016 | Sala | B60N 2/002 |
| 2003/0135346 A1 | 7/2003 | Farmer et al. | |
| 2004/0151366 A1 | 8/2004 | Nefian et al. | |
| 2006/0253241 A1 | 11/2006 | Bothe et al. | |
| 2012/0053793 A1* | 3/2012 | Sala | B60N 2/0244 701/45 |
| 2012/0086249 A1* | 4/2012 | Hotary | B60N 2/0228 297/284.3 |
| 2016/0280161 A1* | 9/2016 | Lippman | B60N 2/002 |

FOREIGN PATENT DOCUMENTS

| | | | |
|---|---|---|---|
| DE | 103 08 413 A1 | 9/2004 | |
| DE | 10 2008 018 397 A1 | 10/2008 | |
| DE | 10 2007 023 141 A1 | 11/2008 | |
| DE | 10 2010 035 203 A1 | 3/2012 | |
| DE | 102013021576.5 | 12/2013 | |
| EP | 1 842 735 A2 | 10/2007 | |
| WO | WO 2012048100 A2 * | 4/2012 | ........... B60N 2/0228 |
| WO | PCT/EP2014/003205 | 12/2014 | |

OTHER PUBLICATIONS

German Office Action for Application No. 102013021812.8 dated Nov. 7, 2014.
International Search Report PCT/EP2014/003381 mailed Oct. 5, 2015.

* cited by examiner

METHOD AND SYSTEM FOR OPERATING A MOTOR VEHICLE

CROSS REFERENCE TO RELATED APPLICATIONS

This application is the U.S. national stage of International Application No. PCT/EP2014/003381, filed Dec. 16, 2014 and claims the benefit thereof. The International Application claims the benefit of German Application No. 102013021812.8 filed on Dec. 20, 2013, both applications are incorporated by reference herein in their entirety.

BACKGROUND

Described below are a method and system for operating a motor vehicle.

DE 102 57 963 A1 shows a method for determining the positioning of a vehicle occupant in a motor vehicle. A head position of the vehicle occupant is sensed with the aid of an optical sensor, a head support of the motor vehicle being adjusted in consideration of an anthropometric model provided.

DE 10 2007 023 141 A1 shows a method for adjusting a comfort and/or safety system in a motor vehicle using an image sensing unit to sense a head position of a vehicle occupant and, in dependence thereon, the comfort and/or safety system of the motor vehicle is correspondingly adjusted.

DE 10 2008 018 397 A1 shows a method for controlling an air conditioning system of a motor vehicle. In this context, the alignment of an air exit nozzle of the air conditioning system is changed based on a sensed head position of a vehicle occupant.

DE 103 08 413 A1 shows a method for controlling a heating/air conditioning system of a motor vehicle. The heating/air conditioning system is adjusted here in dependence on a sensed head position of a vehicle occupant.

US 2006/0253241 A1 shows a method for adjusting a vehicle seat of a motor vehicle. The vehicle seat is adjusted in dependence on a head position, sensed by a time-of-flight-camera, of a vehicle occupant.

The method described below provides an improved vehicle-occupant-individual adaptation of functional units of a motor vehicle.

SUMMARY

In the method for operating a motor vehicle described herein, a spatial position of at least one first body part, arranged within a sensing range of a sensing device of the motor vehicle, of a vehicle occupant with respect to the motor vehicle is sensed by the sensing device. Furthermore, an anthropometric data model is provided with data regarding the dimensions of predetermined body parts of a person and the positioning of the body parts with respect to one another. According to the method, a spatial position of at least one second body part of the same vehicle occupant is determined which is arranged outside the sensing range of the sensing device, this being effected taking into consideration the detected spatial position of the first body part and of the anthropometric data model. Furthermore, at least one functional unit of the motor vehicle is actuated, taking into consideration the determined spatial position of the second body part.

In this context, the inventors found that sensing devices in motor vehicles which are used for sensing the spatial position or positioning of body parts of vehicle occupants usually only have a restricted sensing range. If, for example, such a sensing device which can be, for example, a camera system or the like, is arranged in the area of a roof liner of a motor vehicle, it may be that certain body parts of a vehicle occupant are not within the sensing range of the sensing device at all and their position and spatial position can thus not be sensed at all. It is possible to infer the spatial position of at least one second body part of the same vehicle occupant based on a body part located within the sensing range in combination with a provided anthropometric data model, when the second body part is outside the sensing range of the sensing device. Thus, it is possible to determine or estimate the spatial position of all body parts of a vehicle occupant, including body parts which are outside the sensing range of the sensing device. This enables a particularly accurate actuation and adjustment of the most varied functional units of the motor vehicle to be effected by taking into consideration body parts not located within the sensing range, by which, for example, the comfort or also the safety of a vehicle occupant can be enhanced.

In advantageous embodiment, a spatial position of a first shoulder, arranged within the sensing range, of the vehicle occupant is sensed and, taking into consideration the sensed spatial position of the first shoulder and of the anthropometric data model, a spatial position of a second shoulder of the vehicle occupant is determined. During this process, a height adjustment device of a seat belt of the motor vehicle may be actuated automatically, taking into consideration the determined spatial position of the second shoulder. As a result, it is possible to optimally adjust a seat belt of a vehicle occupant concerned even if the shoulder relevant to the height adjustment of the seat belt should lie outside the sensing range of the sensing device. This makes it possible to ensure an optimum restraint of the vehicle occupant by the optimized height adjustment of the seat belt. This makes it possible to avoid injuries by incorrectly adjusted seat belts.

A further advantageous embodiment provides that a spatial position of a shoulder, arranged within the sensing range, of the vehicle occupant is sensed and, taking into consideration the sensed spatial position of the shoulder and of the anthropometric data model, a spatial position of a head of the vehicle occupant is determined. In other words, the spatial position of the head of the vehicle occupant can also be determined even if the head should lie outside the sensing range of the sensing device. The triggering of an airbag, particularly of a head airbag, may be parameterized taking into consideration the determined spatial position of the head. For example, the airbag can be triggered delayed with respect to a standard setting or triggered not at all, taking into consideration the determined spatial position of the head. For example, it might occur that the relevant vehicle occupant has just moved in the direction of a head airbag so that triggering the airbag in an accident situation would possibly lead to strong injuries to the head of the vehicle occupant. Due to the permanent determination of the head position, even if the head is not at all within sensing range of the sensing device, such cases can be avoided due to the fact that the airbag is triggered in an adapted manner, taking into consideration the determined spatial position of the head, if this should be safer for the vehicle occupant concerned.

In a further advantageous embodiment, an air conditioning system of the motor vehicle is parameterized automatically, taking into consideration the determined spatial position of the head. For example, a temperature and/or flow rate distribution of the air conditioning system can be parameterized. Thus, an optimized adjustment or actuation of the air conditioning system can be effected vehicle-occupant-individually with knowledge of the spatial position or of the position of the head of the relevant vehicle occupant, respectively, so that a particularly pleasant and draft-free temperature control of the internal vehicle space can be produced.

A further advantageous embodiment provides that a height adjustment device of a head support of the motor vehicle is actuated automatically, taking into consideration the determined spatial position of the head. It is also possible, even if the head of the vehicle occupant concerned should be located outside the sensing range of the sensing device, to determine the head position in the manner already described, nevertheless, and to adjust the head support or the height adjustment of the head support, respectively, suitably for the vehicle occupant concerned as a result of which the risk of injury can be reduced considerably for the vehicle occupant in the case of accidents.

The system for operating a motor vehicle described herein includes a sensing device which is designed to determine a spatial position of at least one first body part, arranged within a sensing range of the sensing device, of a vehicle occupant with respect to the motor vehicle. The system also includes a storage device which is designed to provide an anthropometric data model which relies on data with respect to the dimensions of the predetermined body parts of a person and the positioning of the body parts. The system also includes a data processing device designed to determine a spatial position of at least one second body part of the same vehicle occupant which is arranged outside the sensing range of the sensing device, taking into consideration the sensed spatial position of the first body part and of the anthropometric data model. Furthermore, the system also includes a control device designed to actuate at least one functional unit of the motor vehicle taking into consideration the determined spatial position of the second body part. Advantageous embodiments of the method described herein should be considered as advantageous embodiments of the system, the system, in particular, is capable of performing the method.

The features and feature combinations mentioned above in the description and the features and feature combinations mentioned subsequently in the figure description and/or shown alone in the figures can be used not only in the combinations specified in each case but also in other combinations or by themselves without departing from the framework of the invention.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
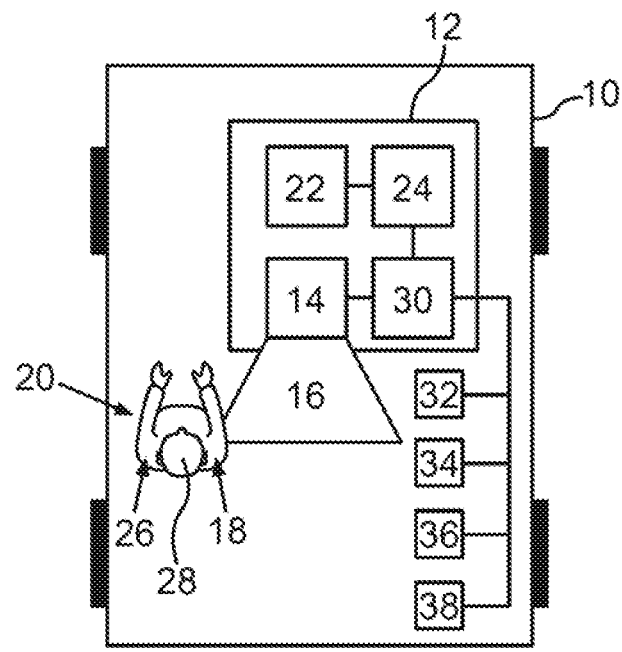
FIG. 1 is a block diagram of a motor vehicle with a system for sensing and determining body parts of vehicle occupant and a control device for actuating different functional units of the motor vehicle; and in FIG. 2 is a perspective view of an internal space, shown partially, of the motor vehicle, wherein a driver of the motor vehicle is shown.

Reference will now be made in detail to the preferred embodiments, examples of which are illustrated in the accompanying drawings, wherein like reference numerals refer to like elements throughout.

A motor vehicle 10 with a system 12 for operating the motor vehicle is shown in a diagrammatic representation in FIG. 1. The system 12 includes a sensing device 14 which is designed to determine a spatial position of at least one first body part 18, arranged within a sensing range 16 of the sensing device 14, of a vehicle occupant 20.

In the present case, the body part 18 is the right-shoulder of the vehicle occupant 20. The system 12 also includes a storage device 22 which is designed to provide an anthropometric data model with data relating to the dimensions of predetermined body parts of a person and the positioning of the body parts with respect to one another. In addition, the system 12 includes a data processing device 24 which is designed to determine a spatial position of at least one second body part 26, 28 of the same vehicle occupant 20 which is arranged outside the sensing range 16 of the sensing device 14, taking into consideration the sensed spatial position of the first body part 18 and of the anthropometric data model.

In the present case, the body parts 26, 28 located outside the sensing range 16 are the left-hand shoulder or the head, respectively, of the vehicle occupant 20. Finally, the system 12 also includes a control device 30 which is designed to actuate a plurality of functional units 32, 34, 36, 38 of the motor vehicle 10, taking into consideration the determined spatial position of the body parts 26, 28 located outside the sensing range 16.

In the present case, the functional unit 32 is a height adjustment device of a seat belt of the motor vehicle 10. The functional unit 34 is a head airbag which is arranged in the area of the head 28 of the vehicle occupant 20 within the motor vehicle 10. The functional unit 36 is an air conditioning system of the motor vehicle 10. The functional unit 38 is a height adjustment device of a head support of the seat in which the vehicle occupant 20 is sitting.

Figure 2:
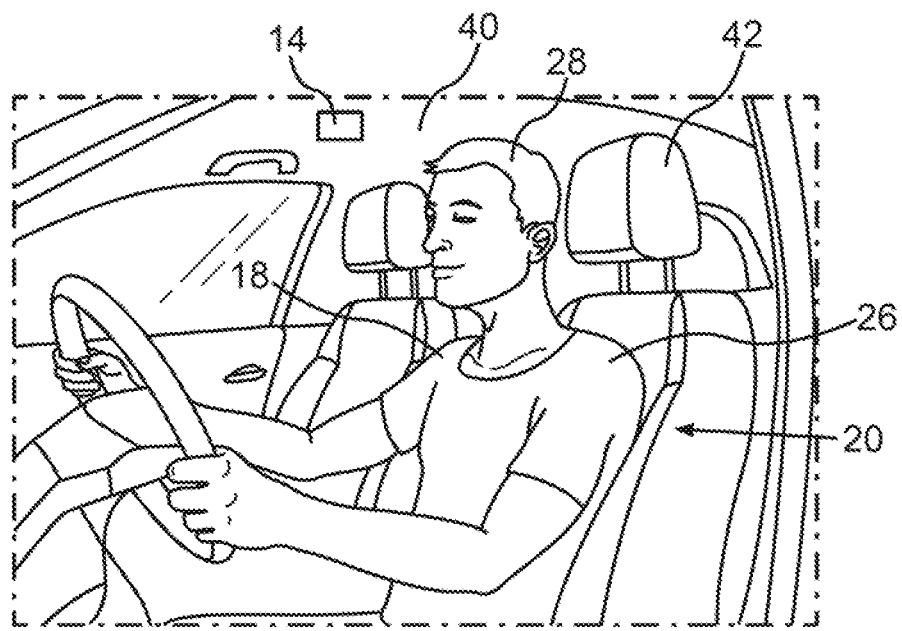

FIG. 2 shows a perspective view of a section of the interior space of the motor vehicle 10. In the case shown presently, the sensing device 14 is arranged in a roof lining 40 of the motor vehicle 10. The sensing device 14 here then has such a sensing range 16 that the right-hand shoulder 18 of the vehicle occupant is still located within the sensing range 16, both the head 28 and the left-hand shoulder 26 being located outside the sensing range 16.

In the text which follows, a method for operating the motor vehicle 10 will be explained in greater detail. Initially, a spatial position of the right-hand shoulder 18 of the vehicle occupant is sensed by the sensing device 14 which is also easily possible since the right-hand shoulder 18, as already explained, is arranged within the sensing range 16 of the sensing device 14. Furthermore, the anthropometric data model is provided by the storage device 22. Subsequently, a spatial position of the left-hand shoulder 26 of the vehicle occupant 20 is determined which is arranged outside the sensing range of the sensing device 14. In this context, the sensed spatial position of the right-hand shoulder 18 and the provided anthropometric data model are taken into consideration. Knowing the spatial position or position of the right-hand shoulder 18, respectively, the spatial position and position of the left-hand shoulder 26 can be determined in a simple manner by a comparison with the anthropometric data model since, due to the anthropometric data model, the dimensions of predetermined body parts of a person and the positioning of the body parts with respect to one another are known.

Subsequently, the height adjustment device 32 of the seat belt, arranged on the driver side, of the motor vehicle 10 is actuated automatically with consideration of the determined spatial position of the left-shoulder 26. If, for example, the height adjustment device 32 should not be set correctly for the body size and seat position of the vehicle occupant 20, the height adjustment device 32 is actuated correspondingly by the control device 30 in such a manner that the seat belt is adjusted optimally for the size and seat position of the vehicle occupant 20.

Furthermore, a position is space of the head 28 of the vehicle occupant 20 is determined taking into consideration the sensed spatial position of the right-hand shoulder 18 and the provided anthropometric data model. If the vehicle 10 is involved in an accident, in which the head airbag 34 would usually be triggered, triggering of the head airbag 34 will be parameterized with consideration of the determined spatial position of the head 28. If, for example, the head position is unfavorable in such a manner that triggering of the head airbag 34 would lead to an injury of the vehicle occupant 20, the head airbag 34 can be triggered, for example, delayed with respect to a standard setting or not triggered at all, taking into consideration the determined spatial position of the head 28.

Knowing the head position of the vehicle occupant, the air conditioning system 36 of the motor vehicle is additionally parameterized automatically. For example, a temperature and/or flow rate distribution of the air conditioning system is parameterized in such a manner that a particularly draft-free air conditioning of the interior space of the vehicle is achieved with a pleasant temperature distribution. For example, knowing the head position, the air outlet rate of the air conditioning system can be adjusted in such a manner that particularly low flow rates are present in the interior space of the vehicle in the head area.

In addition, the height adjustment device 38 of the head support 42 of the motor vehicle 10 is actuated automatically taking into consideration the determined spatial position of the head 28. If the head support 42 is not set to the right height, the control device 30 actuates the height adjustment device 38 of the head support 42 in such a manner that the head support 42 is set optimally, considering the determined head position of the vehicle occupant 20, as a result of which whiplash traumas and similar injuries can be avoided in the case of an accident.

In the example shown above, the adjustment or parameterization of the most varied functional units 32, 34, 36, 38 of the motor vehicle 10 was explained, taking into consideration the detected positions of different body parts 18, 26, 38 of the vehicle occupant 20.

In this context, the method can be performed similarly in the same way for vehicle occupants sitting at different positions of the motor vehicle 10. Overall, the system 12 explained and method enable the positioning of the most varied body parts of vehicle occupants of a motor vehicle to be determined even if corresponding sensing devices are not suited to sense all body parts of the vehicle occupants. Due to the reliable ascertainability of the spatial positions or positionings, respectively, of the most varied body parts of vehicle occupants, it is possible to adjust comfort- and safety-related functional units of a motor vehicle automatically and optimally to the body size and seat position of the occupants. As a result, both the comfort for vehicle occupants and the safety of vehicle occupants in motor vehicles can be increased.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004)

The invention claimed is:

1. A method for operating a motor vehicle, comprising:
    sensing a spatial position with respect to the motor vehicle of at least one first body part of a vehicle occupant, including a first shoulder, arranged within a sensing range of a sensing device of the motor vehicle, by the sensing device;
    providing an anthropometric data model with data relating to dimensions of predetermined body parts of a human being and positioning of the body parts with respect to one another;
    determining a spatial position of at least one second body part, including at least one of a second shoulder and a head, of the vehicle occupant arranged outside the sensing range of the sensing device, taking into consideration the spatial position of the at least one first body part and the anthropometric data model; and
    actuating at least one functional unit of the motor vehicle, taking into consideration the spatial position of the at least one second body part, including at least one of a seat belt height adjustment device of the motor vehicle is actuated automatically, taking into consideration the spatial position of the second shoulder and, taking into consideration the spatial position of the head, an air conditioning system of the motor vehicle is automatically parameterized and/or a head support height adjustment device of the motor vehicle is automatically actuated.

2. The method as claimed in claim 1, further comprising parameterizing a triggering of a head airbag, taking into consideration the spatial position of the head.

3. The method as claimed in claim 2, further comprising one of delaying and preventing the triggering of the head airbag with respect to a standard setting, taking into consideration the spatial position of the head.

4. The method as claimed in claim 1, further comprising parameterizing at least one of a temperature and flow rate distribution of an air conditioning system of the motor vehicle.

5. A system for operating a motor vehicle having functional units, including at least one of a seat belt height adjustment device and a head support height adjustment device, said system comprising:
    a sensing device configured to determine a spatial position with respect to the motor vehicle of at least one first body part of a vehicle occupant, including a first shoulder, arranged within a sensing range of the sensing device;
    a storage device configured to provide an anthropometric data model with data relating to dimensions of predetermined body parts of a human being and positioning of the body parts with respect to one another;
    a data processing device configured to determine a spatial position of at least one second body part, including at least one of a second shoulder and a head, of the vehicle occupant, which is arranged outside the sensing range of the sensing device, taking into consideration the spatial position of the first body part and of the anthropometric data model;
    a control device configured to actuate at least one of the functional units of the motor vehicle, taking into consideration the spatial position of the at least one second body part, of the vehicle occupant, including at least one of automatically actuating the seat belt height adjustment device of the motor vehicle taking into consideration the spatial position of the second shoulder and, taking into consideration the spatial position of the head, automatically parameterizing an air conditioning system of the motor vehicle and/or automatically actuating the head support height adjustment device of the motor vehicle.

6. The system as claimed in claim 5, wherein the functional units of the motor vehicle further include a head airbag, and wherein the control device is further configured to parameterize a triggering of the head airbag, taking into consideration the spatial position of the head.

7. The system as claimed in claim 6, wherein the control device is further configured to one of delay and prevent the triggering of the head airbag with respect to a standard setting, taking into consideration the spatial position of the head.

8. The system as claimed in claim 5, wherein the functional units of the motor vehicle further include an air conditioning system, and wherein the control device is further configured to parameterize at least one of a temperature and flow rate distribution of the air conditioning system of the motor vehicle.

* * * * *